June 19, 1934.  G. C. TROTTER  1,963,535
LOCK WASHER
Filed July 8, 1931
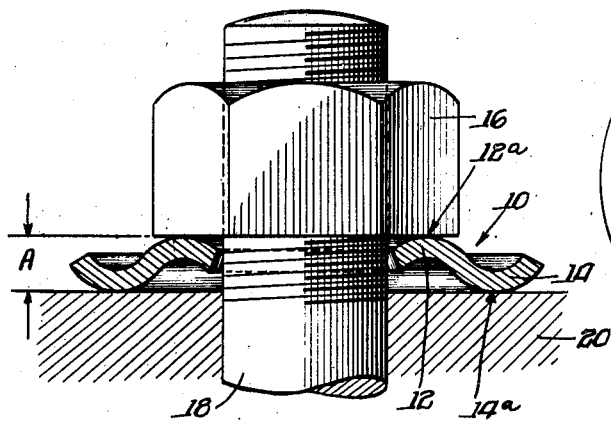
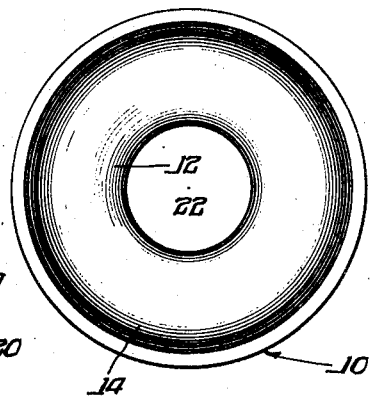
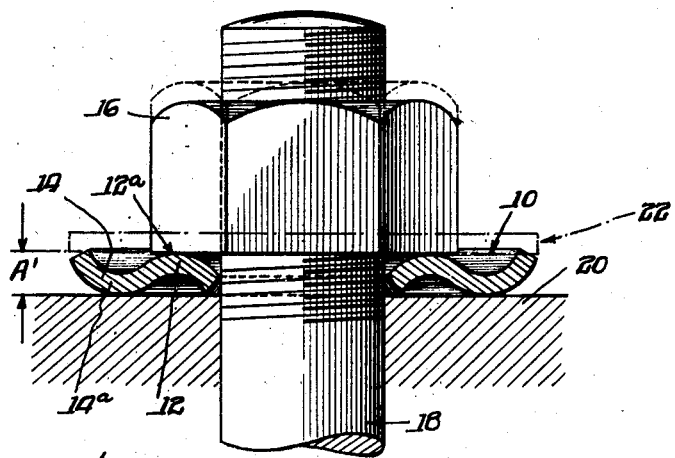
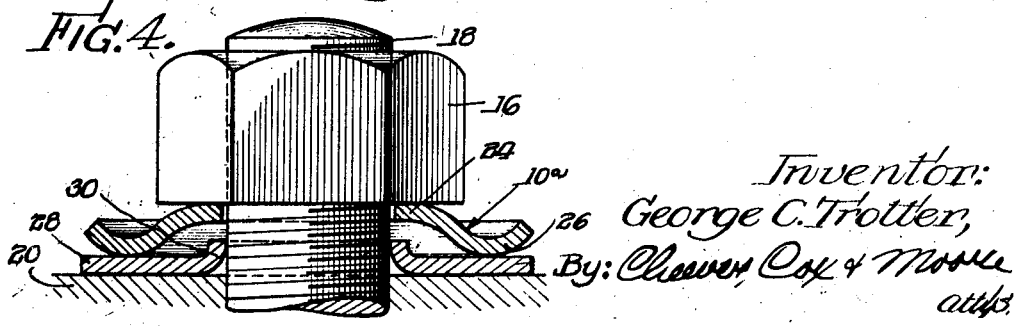
Inventor:
George C. Trotter,
By: Cheever, Cox & Moore
attys.

Patented June 19, 1934

1,963,535

UNITED STATES PATENT OFFICE 1,963,535

LOCK WASHER

George C. Trotter, Chicago, Ill., assignor, by mesne assignments, to Illinois Tool Works, Chicago, Ill., a corporation of Illinois Application July 8, 1931, Serial No. 549,353

4 Claims. (Cl. 151—38)

My invention relates generally to lock washers and particularly to washers of the type adapted to be used with clamping devices which are subjected to changes in position during their operative association with a work piece.

In designing clamping devices for certain types of structures, such as structures which are subjected to severe changes in climatic conditions, the fact that these structures will change their position or shape under such conditions, must be considered. Thus, for example, in screwing cross arms on telephone poles, the threaded bolts are commonly employed. Frequently the nuts on the bolts are clamped against the wooden cross arms when they are swollen, due to the presence of moisture. When the cross arm subsequently dries out and contracts, the nut does not exert sufficient clamping force to retain the cross arm in a horizontal position.

It is one of the primary objects of my invention to provide a washer construction adapted to be used between work pieces, such as the above mentioned cross arms and nuts, which washer will be self-adjustable so as to accommodate itself for variations in the spaced relationship between said work pieces.

As another example of changes in the relative disposition of work pieces, reference is made to the bolts which are employed for securing electrical transformers in position. These transformers are continuously subjected to variations in temperature as a result of electrical energy being dissipated in heat. Obviously these bolts expand and contract a certain amount, and it has been found that as a result of these changes the nuts on the bolts frequently loosen.

My invention contemplates the provision of a spring type washer of extremely simple construction, which is adapted to axially adjust itself to accommodate variation in spaced relationship between a clamping member and a work piece without experiencing appreciable variation in locking or binding effectiveness.

More specifically, my invention contemplates the provision of a spring washer having connected inner and outer annular sections, one of said sections being adapted to engage the surface of a clamping member and the other section being adapted to engage the adjacent surface of the work piece, said sections being relatively shiftable axially of the washer without materially affecting the locking effectiveness thereof.

Still another object of my invention is to provide a washer having inner and outer oppositely disposed sections, as above set forth, the inner section having a curved outer surface for engaging the surface of a clamping member, such as a nut, and the outer section having a curved surface for engaging the adjacent side of a work piece, the curves in the washer being such as to enable the outer section to curl in response to the clamping action of the nut, and thereby enable the washer to substantially retain its locking effectiveness, even though the space between the work piece and the nut may vary.

Another object of my invention is to provide a spring washer, as above set forth, having inner and outer annular sections, said sections being so arranged that when a clamping force is exerted upon the washer, the outer section thereof will curl laterally rather than expand radially.

The foregoing and numerous other objects and advantages will be apparent from the following detailed description when considered in connection with the accompanying drawing, wherein—

Figure 1 is a side elevational view of a fragmentary portion of a bolt and nut and a sectional view of a work piece, together with a washer which is representative of one embodiment of my invention;

Figure 2 is a view similar to Figure 1 disclosing the washer of Figure 1 after it has been placed under tension by the clamping action of the nut;

Figure 3 is a plan view of the washer shown in Figure 1;

Figure 4 discloses a modified washer construction which functions on the same principle as the washer disclosed in Figures 1 to 3 inclusive.

Referring now to the drawing more in detail, wherein like numerals have been employed to designate similar parts throughout the various figures, it will be seen that my invention contemplates the provision of a washer designated generally by the numeral 10. This washer includes an inner curved annular section which I have designated by the numeral 12 and an outer curved section which I have designated by the numeral 14. It will be seen that the curvature of the section 12 in the present embodiment is substantially the same as the curvature in the outer section 14. The convex annular surface 12a provided on the inner washer section 12 is adapted to be engaged by a clamping member, such as a nut 16, which in the present disclosure is mounted upon a threaded bolt 18. A similar convex annular surface 14a on the washer section 14 is oppositely disposed from the annular surface 12a and is adapted to engage a suitable work piece 20. The central portion of the washer 10 is provided with an aperture 22 for receiving the bolt 18.

From the foregoing it will be apparent that my improved washer construction includes a pair of inner and outer annular washer sections 12 and 14, said sections being provided respectively with annular curved surfaces 12a and 14a. The inner margin of the section 12 is deflected axially of the washer in a given direction and the outer margin of the section 14 is deflected axially in the opposite direction. Thus, the two sections in radial cross section present an S-shaped body, as clearly shown in Figures 1 and 2. When the washer is initially applied to the bolt 18 and positioned against the surface of the work piece 20, as shown in Figure 1, the plane which is tangent to the annular surface 12a, is spaced from the plane tangent to the annular surface 14a by a distance designated by the letter A in Figure 1. As the nut 16 is tightened upon the threads of the bolt 18 into clamping engagement with the annular surface or ridge 12a, this surface or ridge is moved toward the surface of the work piece 20.

When the nut 16 has been tightened against the washer so as to occupy the position shown in Figure 2, it will be seen that the distance between the planes mentioned above is considerably less, and this distance in Figure 2 is designated by the letter A1. Attention is directed to the changes in the disposition of the annular sections 12 and 14 during the clamping action of the nut 16. Due to the fact that the outer margin of the section 14 is deflected or curved away from the surface of the work piece 20, pressure exerted against the surface or ridge 12a by the nut causes the outer margin of the section 14 to curl away from the surface of the work piece. If this outer margin of the washer were not curved, the force exerted against the ridge 12a would have a tendency to urge the outer margin of the washer radially, or, in other words, would subject this outer portion to radial stresses. As the tightening or clamping action against such a washer continued the opposite force occasioned as a result of the spreading of the washer would increase, thereby necessitating an increase in the force applied to tightening the nut. By having the outer margin of the washer constructed in accordance with the teachings of my invention, namely, initially deflected or curved away from the surface of the work piece, this increase in clamping force is not experienced because, as the nut continues to tighten against the washer, the outer margin thereof has a natural or normal tendency to curl away from the work piece and not to stretch or radially expand. That is to say, by providing the washer with a marginal deflection or bend prior to the clamping thereof, this marginal bend initiates the further bending or curving which takes place when the clamping force of the nut is applied to the inner annular surface or ridge 12a. The curling of the outer margin of the washer does not set up increases in stresses within the washer body, which would have a tendency to oppose the clamping action of the nut, and therefore the clamping force required to move the nut 16 from the position shown in Figure 1 to the position shown in Figure 2, varies only a small amount in comparison with the degree of deflection experienced by the washer. Stated in another way, the tension set up within the spring washer 10 varies a small amount over a rather wide range of washer deflection. Obviously this substantial uniformity in tension is maintained within predetermined limits of deflection, dependent upon the inherent structural characteristics of the washer. In the present modification this uniform washer tension or locking effectiveness if maintained within required limits as the nut is moved from the position shown in Figure 1 to the position shown in Figure 2.

The dot-and-dash lines shown in Figure 2 illustrate how the lock washer of my improved design may be employed to exert increased locking action. It will be noted that a washer 22 designated by dot-and-dash lines in Figure 2, may be interposed between the nut 16 and the washer 10. This washer 22 is of sufficient diameter to extend beyond the outer margin of the washer 10. Thus, when the nut 16 is clamped in position, the washer 22 is not only engaged by the annular surface or ridge 12a, but is also engaged by the outer margin of the washer section 14. In place of the washer 22 a nut may be employed which is of sufficient diameter so as to directly engage the outer margin of the lock washer 10 but this engagement does not occur during the initial clamping of the washer. In fact during said initial clamping, the marginal edges are free from engagement with the surfaces of the clamping element, or in other words said edges during the initial clamping of the washer are positioned between planes coincident with the crests or surfaces 12a and 14a.

Referring to Figure 4, it will be seen that a slightly modified lock washer is disclosed, which is designated generally by the numeral 10a. This washer corresponds structurally with the washer 10 except at its inner margin. It will be seen that the washer 10a comprises an inner annular section 24 which corresponds with the section 12 of the washer 10, and an outer annular section 26 which corresponds with the section 14 of the washer 10. The inner annular section 24 does not curve away from the nut 16 as does the inner margin of the washer 10. However, the same functional characteristics are present in the washer 10a as are present in the washer 10. As the nut 16 is clamped against the washer 10a, the outer sections 26 curve or curl away from a washer 28, which washer bears directly against the work piece 20. This washer 28 is provided with a central boss 30, and when the washer is completely clamped in position, the inner margin thereof is adapted to bear against this boss or shoulder 30.

From the foregoing it will be apparent that my invention contemplates the provision of a washer construction, which is particularly adapted for use in connection with parts which are adapted to change their position as a result of variations in climatic conditions, etc. It should be noted that by having the washer constructed in the manner described, I am able to materially reduce the load variation of the washer within the range of the normal axial deflection experienced by the crests or surfaces 12a and 14a when the washer is subjected to actual use. Thus, if the space A' disclosed in Figure 2 increases to the space A disclosed in Figure 1 as a result of the contraction of the work piece 20 or the nut 16, the variation in clamping force exerted by the washer will be greatly reduced. In other words, the washer is self-conformable to variations in the spaced relationship of the parts with which it is associated, in such a manner as to maintain an effective locking action at all times. Applicant's invention is not limited to the specific washer construction shown in the drawing but is capable of other mod-

Having thus described my invention, what I claim as new and desire to secure by Letters Patent is:

1. A spring washer including inner and outer yieldably connected annularly disposed sections, said sections having work engaging surfaces disposed on opposite sides of a medial plane perpendicular to the washer axis and shiftable axially when engaged by a clamping element such as a nut or screw head, the marginal portions of the inner and outer sections being oppositely curved so as to effect reduction in load variation of the washer within a given range of axial deflection experienced by the surfaces when the washer is subjected to actual use, the edges of said marginal portions, when the washer is initially clamped, being free from engagement with the surfaces of the elements between which the washer is clamped.

2. A spring washer including inner and outer yieldably connected annularly disposed sections, said sections having work engaging surfaces disposed on opposite sides of a medial plane perpendicular to the washer axis and shiftable axially when engaged by a clamping element such as a nut or screw head, the marginal portion of said outer section curving axially so as to effect a reduction in load variation of the washer within a given range of axial deflection experienced by the surfaces when the washer is subjected to actual use, the marginal edges of said inner and outer annular sections when the washer is initially clamped, being positioned between and normally spaced from planes which include the work engaging surfaces of said washer.

3. A spring washer including inner and outer yieldably connected annularly disposed sections, said sections having work engaging surfaces disposed on opposite sides of a medial plane perpendicular to the washer axis and shiftable axially when engaged by a clamping element such as a nut or screw head, the marginal portions of the inner and outer sections being oppositely curved so as to effect reduction in load variation of the washer within a given range of axial deflection experienced by the surfaces when the washer is subjected to actual use, the edge of said inner marginal portion, when the washer is initially clamped, being positioned between and normally spaced from planes which include said work engaging surfaces.

4. A spring washer including inner and outer yieldably connected annularly disposed sections, said sections having curved work engaging surfaces, said surfaces being disposed on opposite sides of a medial plane perpendicular to the washer axis and shiftable axially when the surface of the inner section is engaged by a clamping element such as a nut or screw head, the outer marginal portion of the outer section curving axially so as to effect a reduction in load variation of the washer within a given range of axial deflection experienced by the surfaces when the washer is subjected to actual use, the extremity of said outer section, when the surface of the inner section is initially engaged by said clamping element, being free from engagement with said clamping element, and the inner extremity of said inner section being free to shift axially when the initial force of said clamping element is exerted thereagainst.

GEORGE C. TROTTER.